United States Patent [19]

Ishiwatari et al.

[11] Patent Number: 5,054,842
[45] Date of Patent: Oct. 8, 1991

[54] FLOOR PANEL FOR OFF-ROAD VEHICLE

[75] Inventors: Makoto Ishiwatari, Tokyo; Akio Handa, Saitama; Takeshi Kobayashi, Tokyo; Takerou Shibukawa, Saitama; Yutaka Murata, Saitama; Tatsuo Masuda, Saitama, all of Japan

[73] Assignee: Honda Giken Kogyo Kabushiki Kaisha, Tokyo, Japan

[21] Appl. No.: 406,089

[22] Filed: Sep. 12, 1989

[30] Foreign Application Priority Data

Sep. 12, 1988 [JP] Japan .................. 63-228143

[51] Int. Cl.⁵ ............................................. B62D 25/20
[52] U.S. Cl. .................................... 296/191; 296/75; 280/169; 180/90.6
[58] Field of Search ............... 296/75, 191, 194, 203, 296/204; 180/90.6, 908; 280/164.2, 169

[56] References Cited

U.S. PATENT DOCUMENTS 1,536,223  5/1925  Koehler ........................... 280/169
3,366,411  1/1968  Vittone ............................ 296/204
3,632,156  1/1972  Schweser ........................ 296/203
4,645,257  2/1987  Salmon ............................ 296/75
4,749,191  6/1988  Gipson et al. ................. 280/169 X

FOREIGN PATENT DOCUMENTS 106184  5/1988  Japan ............................. 296/204
 47683  2/1989  Japan ............................. 296/204

Primary Examiner—Dennis H. Pedder
Assistant Examiner—Andrew C. Pike
Attorney, Agent, or Firm—Lyon & Lyon

[57] ABSTRACT

An off-road vehicle contains a floor panel including a first inclined portion facing the seat and forming a foot rest and a second inclined portion disposed adjacent to and facing the seat and having an irregularly formed surface thereon to protect the driver against slipping upon entering and existing the vehicle. The second inclined portion has an angle of inclination less than that of the first inclined portion and has surface irregularities comprising longitudinally spaced flats interconnected by angularly displaced surface sections.

7 Claims, 5 Drawing Sheets

FLOOR PANEL FOR OFF-ROAD VEHICLE

BACKGROUND OF THE INVENTION

The present invention relates to off-road vehicles and, more particularly, to a floor panel for an off-road vehicle.

In an off-road vehicle having two front wheels and a seat located at a substantially central position of the vehicle body, a floor panel is known that is so arranged as to extend from a position under the seat to a position between the two front wheels (Japanese Patent Laid-Open Publication No. 63-106184). The floor panel disclosed in this reference has an inclined portion formed at a rear region of the floor panel in such a manner as to face the seat. However, the inclined portion is generally flat.

In off-road vehicles of the so-called "sit-in" type having no door mechanism, such as a four-wheel buggy, the driver is required to stand on the floor panel upon getting on and off the vehicle. In the prior art floor panel, as mentioned above, since the inclined portion is generally smooth, the driver has difficulty in standing up on the inclined portion. Moreover, since such vehicle is intended to run off road, mud is often attached to the underside of shoes of the driver, which will cause slippage on the floor panel, thereby rendering negotiation of the surface by the driver more difficult.

It is an object of the present invention, therefore, to provide a floor panel for an off-road running vehicle that reduces slippage by the driver when standing in the vehicle, even if mud is attached to the underside of the driver's shoes, thus to facilitate the driver's entry and exit of the vehicle.

SUMMARY OF THE INVENTION

According to the present invention, there is provided in an off-road running vehicle having two front wheels and a seat located at a substantially central position of a vehicle body, a floor panel extending from a position under said seat to a position between the two front wheels, the floor panel being formed with a first inclined portion at the front end thereof as a foot rest and with a second inclined portion between the first inclined portion and the rear end of the floor panel adjacent the seat, the second inclined portion facing the seat and having an uneven portion thereon.

In the described arrangement the rear portion of the floor panel is so inclined as to face the seat. Therefore, the driver can easily rise from a seated position with his feet placed on the floor panel. Conversely, the driver can easily sit in the seat from a standing position with his feet placed on the floor on the floor panel.

Further, since the uneven portion is formed on the second inclined portion of the floor panel, slippage of the driver on the floor panel can be prevented even if mud is attached on the underside of the shoes, thereby facilitating the driver's entry and exit of the vehicle.

For a better understanding of the invention, its operating advantages and the specific objectives obtained by its use, reference should be made to the accompanying drawings and description which relate to a preferred embodiment thereof.

DETAILED DESCRIPTION OF A PREFERRED EMBODIMENT

Figure 1:
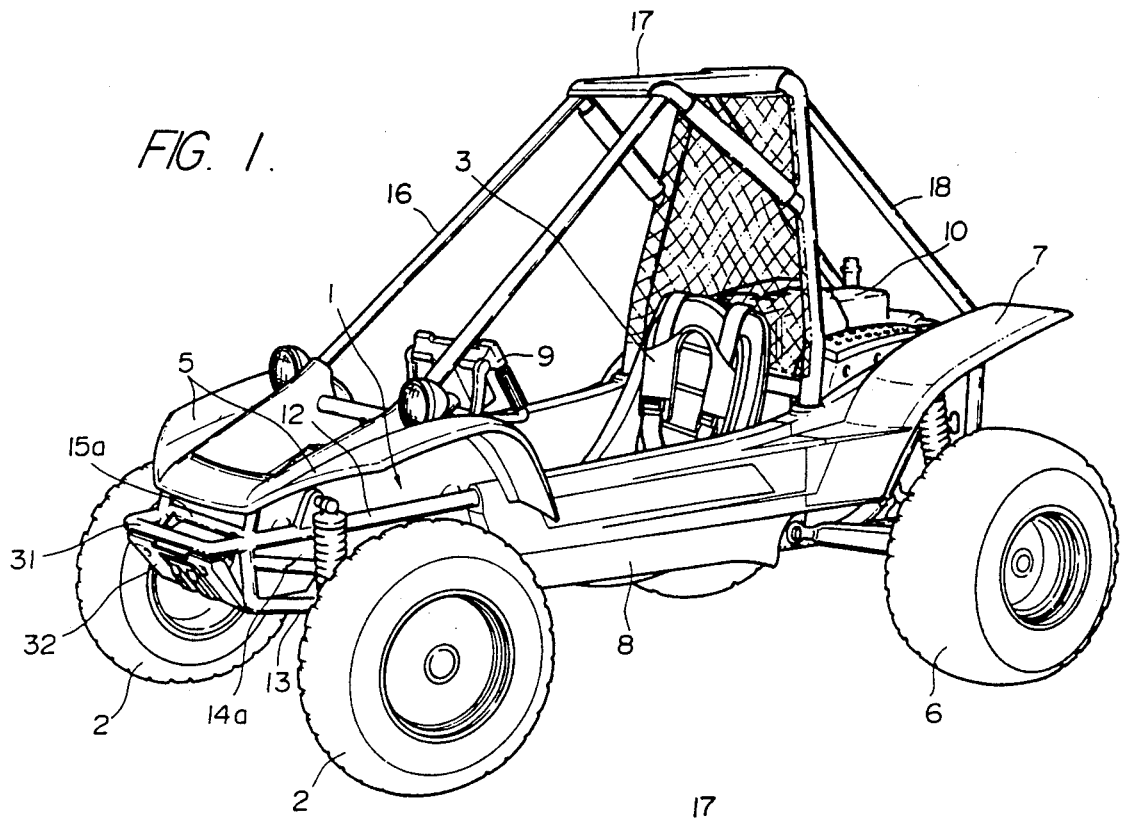
FIG. 1 is a perspective view of an off-road vehicle provided with a floor panel according to the present invention.
Figure 2:
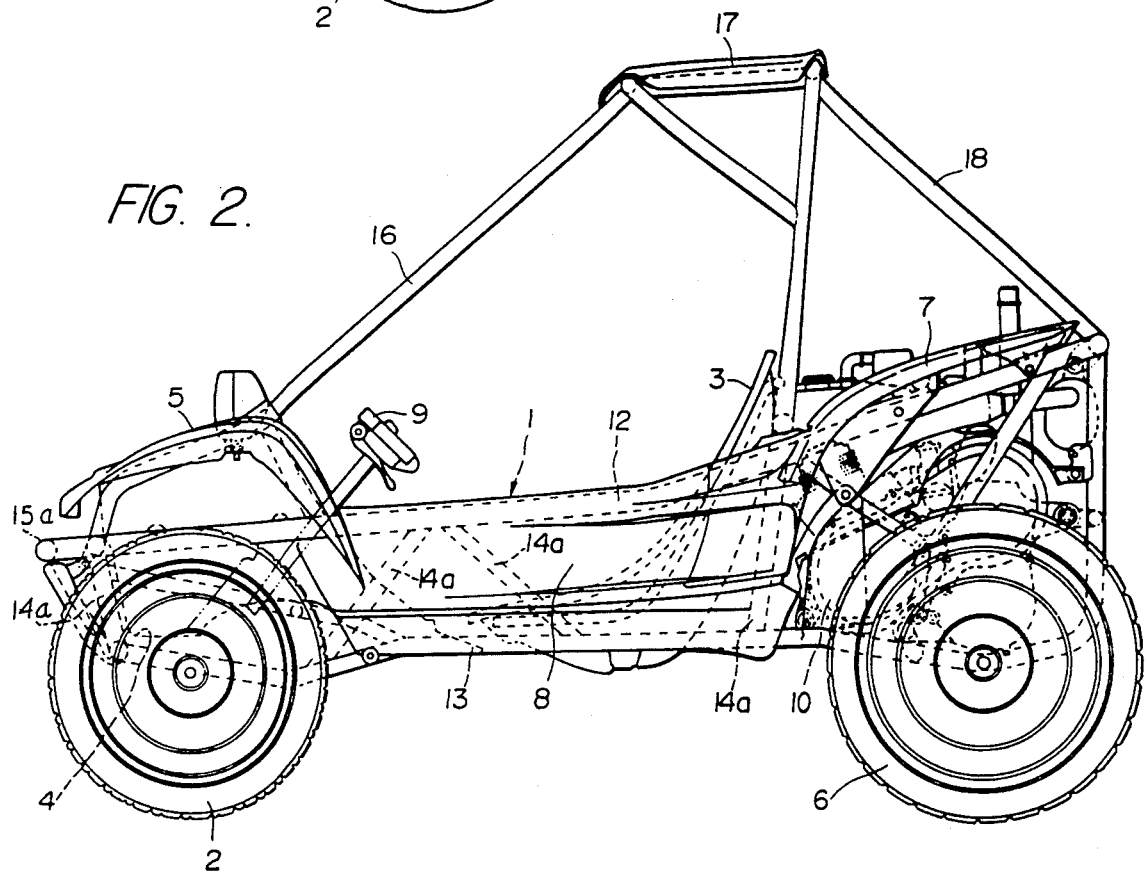
FIG. 2 is a side elevational view of the vehicle of FIG. 1.
Figure 3:
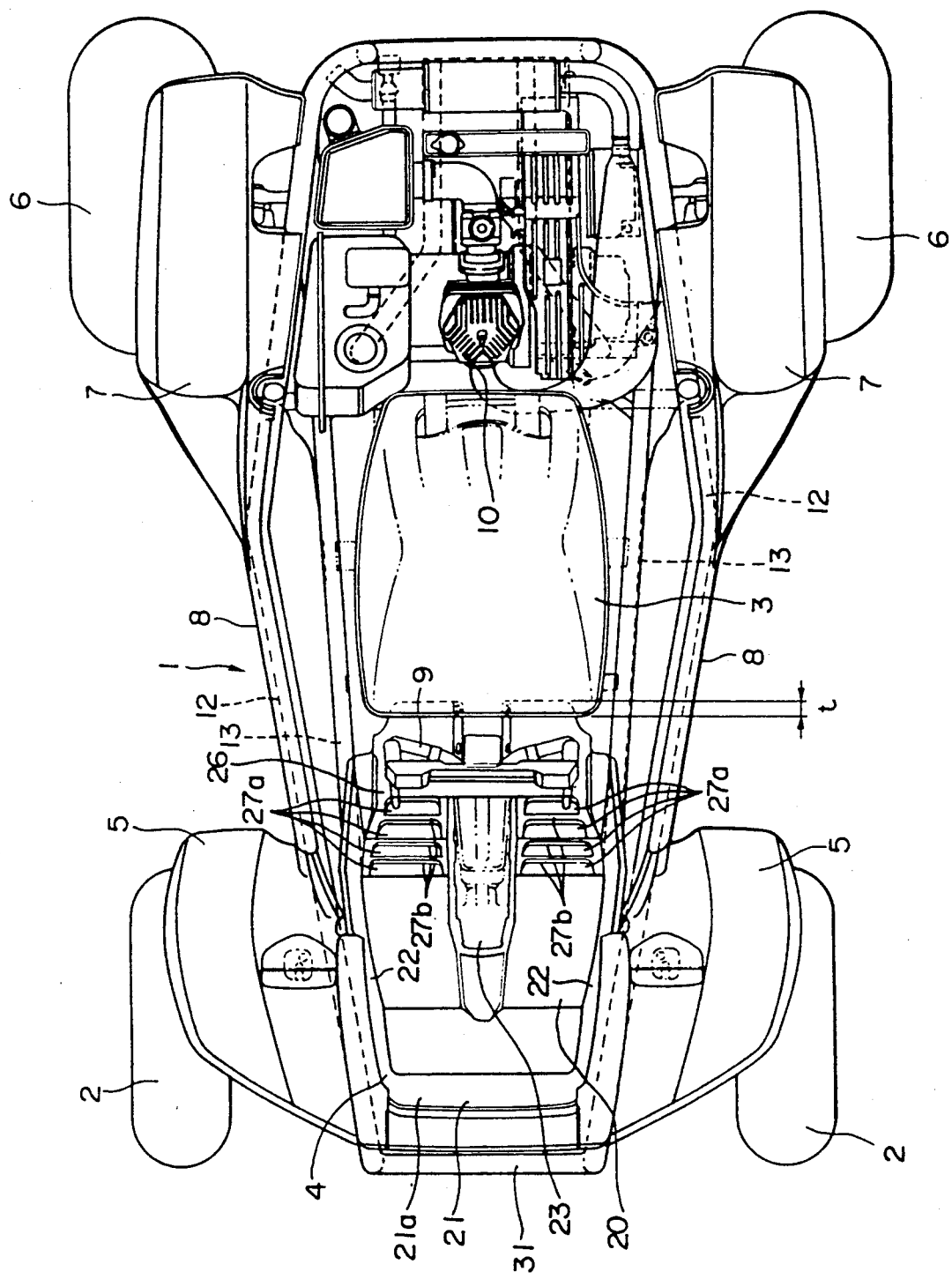
FIG. 3 is a top plan view of the vehicle of FIG. 1.

Referring to FIGS. 1 to 3, the illustrated off-road vehicle includes a vehicle body frame 1 forming the skeleton of a vehicle body, a pair of right and left front wheels 2 supported through suspensions by the vehicle body frame 1 at a front portion thereof, a driver's seat 3 located at a central position of the vehicle body, a floor panel 4 extending from a position under the seat 3 to a position between the front wheels 2, a pair of front fenders 5 mounted to the vehicle body frame 1 so as to cover upper and side portions of the front wheels 2, a pair of right and left rear wheels 6 supported through suspensions by the vehicle body frame 1 at a rear portion thereof, a pair of rear fenders 7 mounted to the vehicle body frame 1 so as to cover upper and side portions of the rear wheels 6, a pair of side panels 8 each extending between each front fender 5 and each rear fender 7 on the same side, a steering handle 9 provided at the front portion of the vehicle body frame 1 for steering the front wheels 2, and an engine 10 mounted behind the seat 3.

The vehicle body frame 1 includes a pair of upper main pipes 12 extending longitudinally of the vehicle body on opposite sides thereof, a pair of lower main pipes 13 extending longitudinally of the vehicle body on opposite sides thereof, a plurality of reinforcing pipes 14a for connecting the upper and lower main pipes 12 and 13 on the respective sides, and a plurality of cross members 15a for interconnecting the right and left upper and lower main pipes 12 and 13, respectively. Thus, the vehicle body frame 1 is substantially symmetrical with respect to the longitudinal central axis of the vehicle.

A pair of front roll bars 16 extend upwardly and rearwardly from the front portion of the vehicle body frame 1, and a pair of rear roll bars 18 extend upwardly and forwardly from the rear portion of the vehicle body frame 1. A center roll unit 17 is positioned over the central portion of the vehicle body frame 1 and is connected with the front roll bars 16 and the rear roll bars 18, thus overlying a driver sitting in the seat 3.

Figure 4:
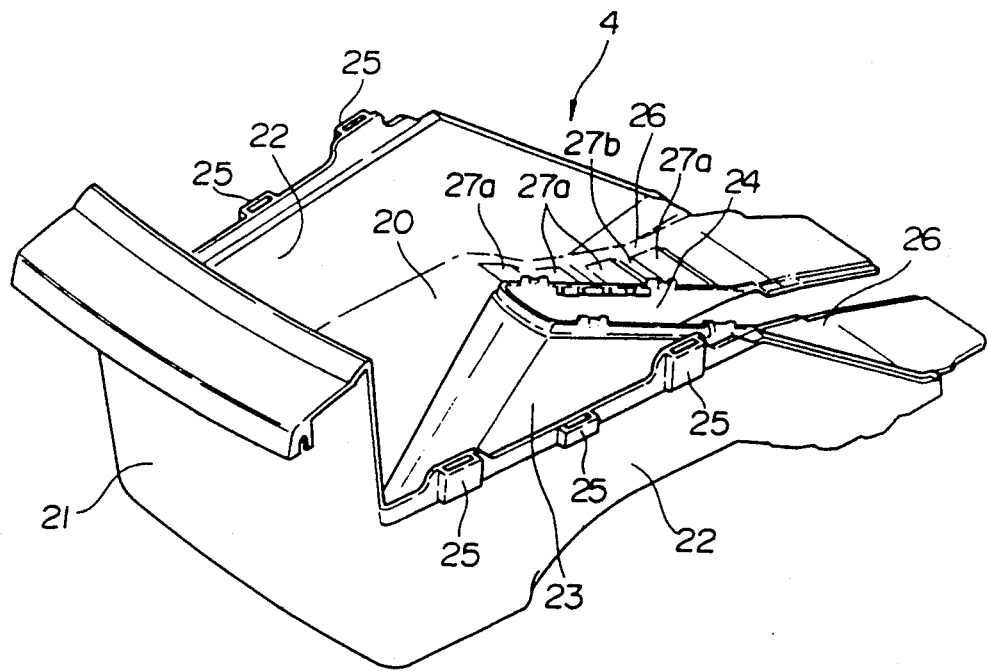
FIG. 4 is a perspective view of the floor panel according to the present invention.
Figure 5:
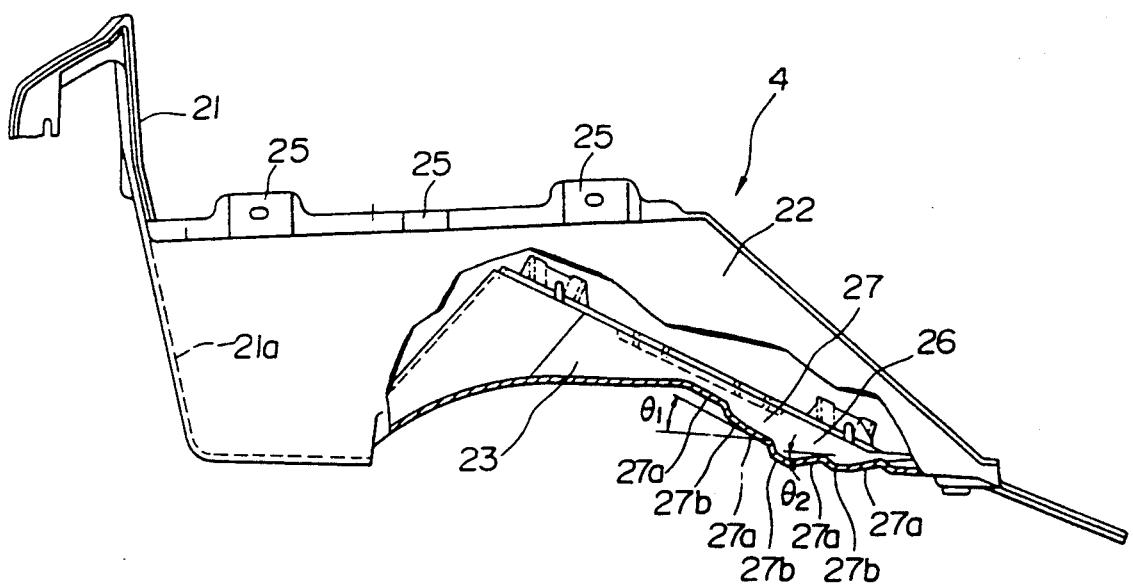
FIG. 5 is a partially sectioned side elevational view of the floor panel of FIG. 4.

The floor panel 4 serves as a member for receiving the feet and legs of a driver sitting in the seat 3. As shown in FIGS. 4 and 5, the floor panel 4 is integrally formed to have a bottom plate portion 20, a front plate portion 21, a pair of right and left side plate portions 22 and a column cover 23 projecting upwardly from the bottom plate portion 20 at a substantially laterally central portion between the side plate portions 22. The column cover 23 is formed with an opening 24 facing rearwardly. The side plate portions 22 are formed at their upper ends with a plurality of thick-walled attachment portions 25 to be bolted to brackets on the vehicle body frame 1 and fitted therewith in a mating manner, so as to fix the floor panel 4 to the vehicle body. The front plate 21 is formed adjacent its lower end with a portion 21a inclined frontwardly to serve as a foot rest for receiving the feet of a driver sitting in the seat 3.

The bottom plate portion 20 of the floor panel 4 is formed with a pair of inclined portions 26 on opposite sides of the column cover 23 and extending between the foot resting inclined portion 21a and the rear end of the floor panel 4 adjacent the seat 3 in such manner as to face the seat. Each of the inclined portions 26 is formed with an irregularly formed surface portion 27. In this preferred embodiment, the irregular portion 27 comprises four laterally elongated flat portions 27a arranged at intervals longitudinally spaced along the bottom plate portion of the floor panel and being disposed each at different inclined angles. Three connecting portions are disposed intermediate and interconnect adjacent flat portions 27a. The front two flat portions 27a are inclined upwardly from a horizontal plane with a relatively greater inclined angle $\Theta_1$, while the rear two flat portions 27a are inclined downwardly from the horizontal plane with a relatively reduced inclined angle $\Theta_2$.

The inclined portion 26 serves as a surface on which the feet of the driver are placed upon entering and exiting the vehicle. As the inclined portion 26 is formed with the irregular surface portion 27, it is difficult for slippage to occur on the inclined portion 26, even if mud is attached to the underside of the shoes of the driver.

The floor panel 4 is positioned in such a manner that even when the slidable seat 3 is slid to a rearwardmost position in the longitudinal direction of the vehicle body, the front end of the seat 3 overlaps the rear end of the floor panel 4, as shown by a distance t in FIG. 3. Accordingly, mud, or the like, is prevented from being splashed from the underside of the vehicle to the driver by the floor panel 4 which is of low cost and light weight. Moreover, this function is conveniently provided without increasing the number of vehicle parts.

Also, while mud, or the like, tends to be splashed from the right and left sides of the vehicle, as well as from the underside thereof, the splashing is obstructed by the front fenders 5 and the side panels 8, so that the driver is effectively protected from the splashed mud, or the like.

Figure 6:
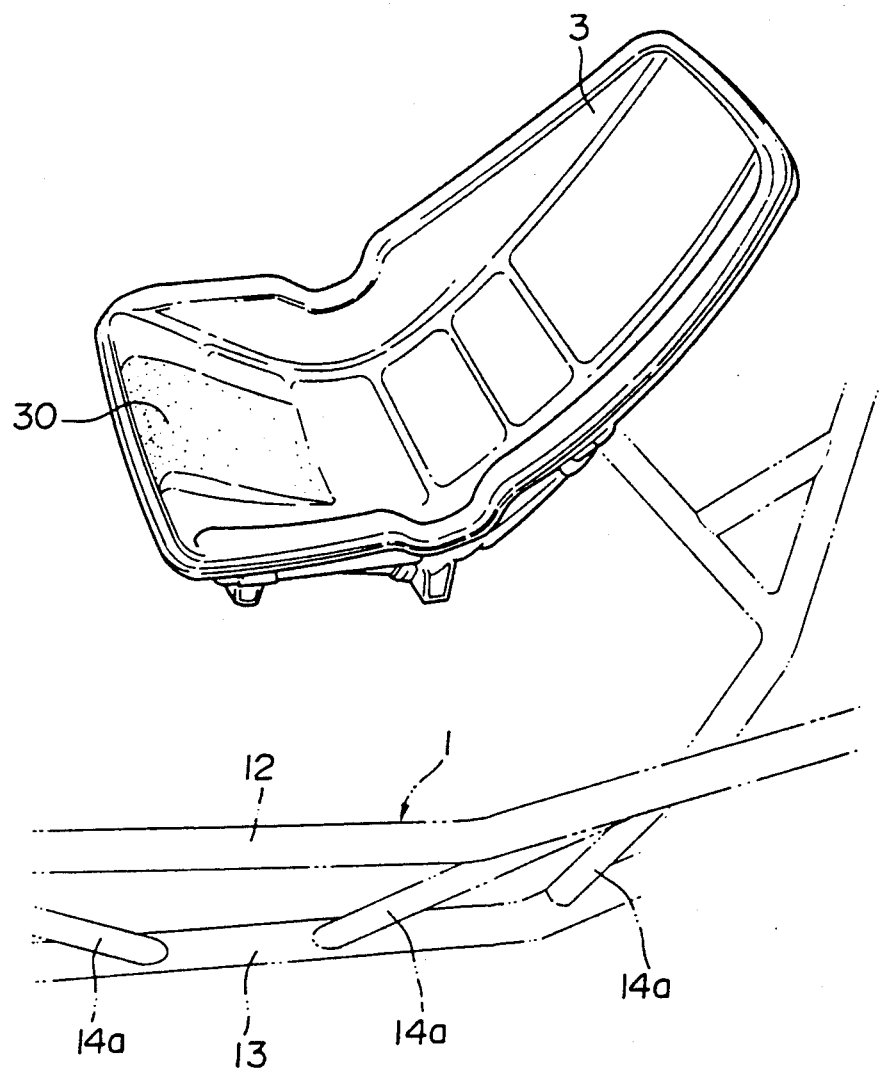
FIG. 6 is a perspective view of a seat for use in the vehicle of FIG. 1.

As shown in FIG. 6, the seat 3 is formed at a front central position with a swollen portion 30 adapted to contact the inside of the femoral region of the driver. With this construction, the seatability of the driver is improved in that, when the vehicle is rapidly braked, for example, the driver will be prevented from slipping forwardly. The swollen portion 30 is preferably formed of a material, such as urethane resin, having a large coefficient of friction and a suitable softness.

Figure 7:
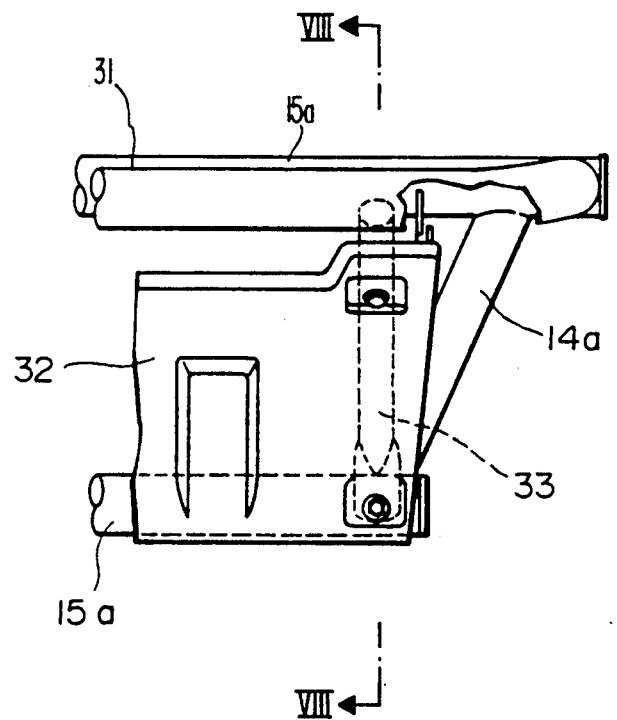
FIG. 7 is a partial elevational view of the front end of the vehicle of FIG. 1.
Figure 8:
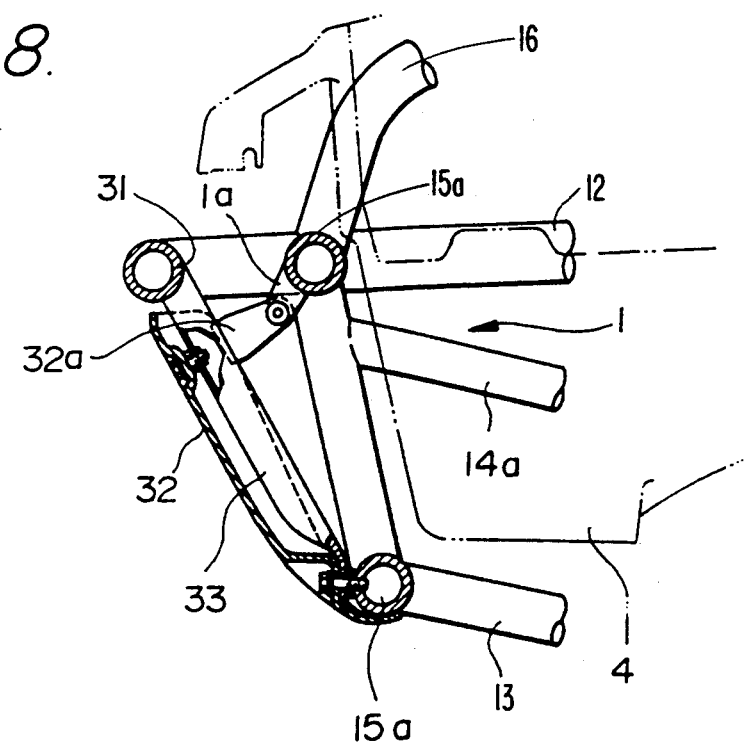
FIG. 8 is a sectional view taken along line VIII—VIII of FIG. 7.

Referring to FIGS. 1, 7 and 8, a U-shaped bumper 31 is provided at the front end of the vehicle body frame 1, and a bumper cover 32 is mounted on the front side of the bumper 31 in such a manner as to extend downwardly rearwardly therefrom. A pair of laterally spaced support members 33 are provided between the bumper 31 and the lower cross member 15a. The bumper cover 32 is bolted at its upper and lower portions to the support members 33, and a pair of stays 32a of the bumper cover 32 are bolted at right and left ends to a pair of brackets 1a extending from the upper cross member 15a of the vehicle body frame 1. With this construction, the front portion of the vehicle body frame 1 and the floor panel 4 are protected by the bumper cover 32 from being damaged by obstacles, such as stones and mud.

Although the irregular portion 27 formed on the inclined surface 26 of the floor panel 4 is constructed of the laterally elongated flat portions 27a and the connecting portions 27b interconnecting the flat portions 27a as described herein, the construction of the irregular portion 27 is not to be so limited. For example, the portion 27 may be constructed of a plurality of lattice-like members or plural small projections.

As described above, the rear portion of the floor panel of an off-road vehicle is so inclined as to face the seat. Therefore, the driver can easily rise from the seated position with his feet placed on the floor panel or, conversely, the driver can easily sit in the seat from an upright position with the feet placed on the floor panel. Further, since the irregular portion is formed on an inclined portion of the floor panel, the danger of slippage of the driver on the floor panel, even if mud, or the like, is attached on the underside of his shoes is avoided, thereby facilitating the driver's entry and exit of the vehicle.

It should be further understood that, although a preferred embodiment of the invention has been illustrated and described herein, changes and modifications can be made in the described arrangement without departing from the scope of the appended claims.

We claim:

1. In a vehicle, particularly of an off-road type, having a frame forming a vehicle body, a pair of oppositely spaced front wheels supporting said frame, a seat disposed substantially at a central position in the vehicle body, an upstanding steering column disposed forwardly of said seat, and a floor panel extending from a rear end adjacent a position under said seat to a front end at a position between said front wheels, said floor panel comprising:

a first inclined portion having a surface disposed forwardly of, and in facing relation to, said seat to form a foot rest;

a bottom plate containing a second inclined portion intermediate said first inclined portion and the rear end of said floor panel, said second inclined portion having a surface disposed forwardly of, and in facing relation to, said seat at an angle of inclination less than that of said first inclined portion; said bottom plate having a column cover upstanding therefrom and intersecting said second inclined portion to divide the same into laterally spaced sections; and said sections of said second inclined portion each having an irregularly formed surface containing a plurality of longitudinally spaced, laterally extending foot-receiving flats mutually spaced in non-uniformly, inclined disposition along a length of the surface of said sections.

2. The floor panel according to claim 1 in which said flats are interconnected by connection portions extending forwardly and upwardly between adjacent flats.

3. The floor panel according to claim 2 further comprising a front plate, and oppositely disposed side plates integrally formed with said bottom plate, said front plate containing said first inclined portion.

4. The floor panel according to claim 1 in which said first inclined portion is disposed at the front end of said floor panel.

5. The floor panel according to claim 1 in which said flats in a forward region of said surface of said second inclined portion are inclined upwardly and said flats in a rearward region thereof are inclined downwardly.

6. In a vehicle, particularly of an off-road type, having a frame forming a vehicle body, a pair of oppositely spaced front wheels supporting said frame, a seat disposed substantially at a central position in the vehicle body, and a floor panel extending from a rear end adjacent a position under said seat to a front end at a position between said front wheels, said floor panel comprising:

a first inclined portion having a surface disposed forwardly of, and in facing relation to, said seat to form a foot rest;

a second inclined portion intermediate said first inclined portion and the rear end of said floor panel, said second inclined portion facing said seat and having an irregularly formed surface thereon containing a plurality of longitudinally spaced, laterally extending, foot-receiving flats mutually spaced in non-uniform, inclined disposition along a length of the surface of said second portion, said flats being interconnected by connecting portion extending forwardly and upwardly between adjacent flats.

7. The floor panel according to claim 6 in which said flats in a forward region of said surface of said second inclined portion are inclined longitudinally upwardly and those in a rearward region thereof are inclined longitudinally downwardly.

* * * * *